L. B. Pitcher.
Mixing Apparatus.
N°. 105,839.        Patented Jul. 26, 1870.
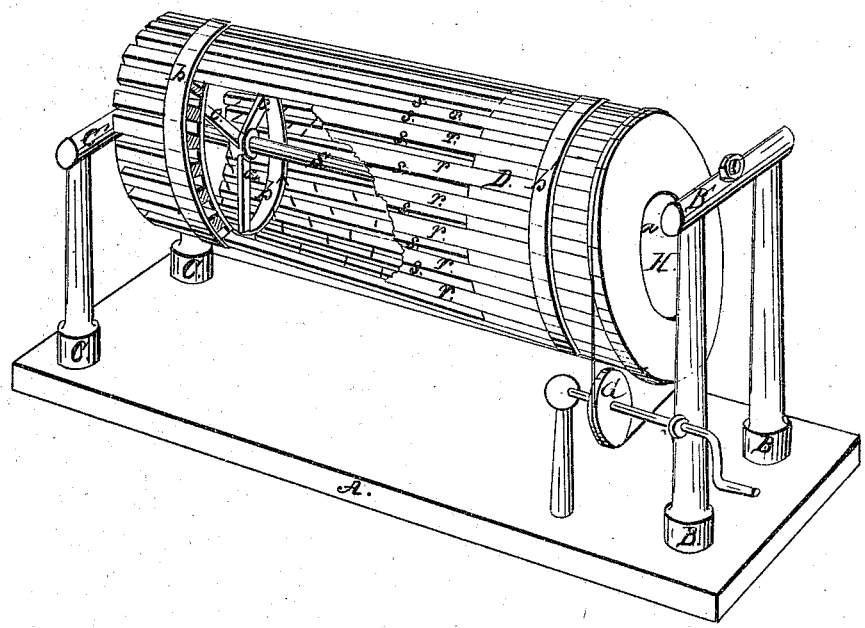
Witnesses:
N. B. Smith
C. W. Smith
Inventor:
Leman B. Pitcher

United States Patent Office.

LEMAN B. PITCHER, OF SALINA, NEW YORK.

Letters Patent No. 105,839, dated July 26, 1870.

IMPROVEMENT IN CYLINDER FOR MIXING FERTILIZERS.

The Schedule referred to in these Letters Patent and making part of the same.

*To all whom it may concern:*

Be it known that I, LEMAN B. PITCHER, of the town of Salina, in the county of Onondaga and State of New York, have invented a certain new and improved Mixing and Sifting-Cylinder for general use in commingling, picking, riddling, and screening various compounds, designed more particularly for agricultural purposes; and I do hereby declare that the following is a full, clear, and exact description of the same, reference being had to the annexed drawing which forms a part of this specification, and which gives a general perspective view of the same, and also a partial interior view where the side is broken.

It is well known that, in agricultural operations, the commingling of manures and soils, making composts, mixing in lime, ashes, plaster, poudrettes, and other commodities for fertilizing purposes, the work has usually been done by hand-labor, with a hoe or shovel, but by this method the stones in the soil, or lime and other large parts have to be thrown out by hand, and the compound, when complete, is often not of that uniform grade of mixture or fineness which is desirable, and these difficulties have greatly retarded such mixing, although agriculturalists have long been aware of its importance and utility.

I prefer to mount the cylinder upon my non-revolving hollow bent shaft, for which Letters Patent of the United States were granted to me bearing date July 21, 1868, for convenience in lubricating the bearings, but more particularly so as to be able to use an open feeding-head, which, with a bent arm to the shaft, leaves the hole in the feeding-head comparatively free from obstruction. No particular manner of mounting is essential.

A is the base of the frame on which the cylinder is mounted.

B B and B', upright posts and cross-bar at the feeding-head.

C C and C' upright posts and cross-bar at the other end.

S, the non-revolving bent shaft, with arm $a$.

H is the open feeding-head, made to project outwardly somewhat, for convenience in feeding, and to keep the materials from falling out of that end.

In the shape of the cylinder D, I prefer that of a truncated cone, and I make it with ribs or staves $z\ z\ z$, separated from each other, so that there will be slots $s\ s\ s$ between them.

For an ordinary-sized machine, the length of the cylinder would be about six feet; the diameter at the larger end about two and a half feet, and at the smaller end about two feet; the staves about three inches wide and one and a quarter thick; the slots about half an inch wide, but their width will vary somewhat in different machines, according to the degree of fineness desired in the mixed compound.

The ribs or staves may be held in place by braces $c\ c$ on the inside, and bands $b\ b$ on the outside, and $b'\ b'$ on the inside, with bolts or rivets through the staves holding the staves to such bands, or in any other common way, to keep them in place.

The staves $z\ z\ z$ are thickly set with strong teeth projecting inwardly, (of iron or other suitable material,) and forming a kind of revolving picker to, facilitate the picking and mixing of the compound.

For about one-third the distance from the feeding-head, more or less, I prefer to close the slots between the stave-work, so that the work of mixing may be more or less complete before the riddling and screening commences.

The remainder is open stave-work, with teeth as above described, so that the work of picking and commingling may continue while the screening proceeds, and the harder and tougher portions picked and torn as much as possible, until, being incapable of further breaking and commingling, they are thrown out at the open head of the cylinder.

The feeding end of the cylinder may be elevated somewhat when required, the height varying with different kinds of material, so that the refuse parts will finally be cast out at the open end of the cylinder.

G is an ordinary hand-gearing to operate the cylinder, which, however, will vary in form according to circumstances, and the manner in which the force is to be applied, and any other method of applying motive power may be used.

A cylinder thus formed and operated will be found of great use in commingling, mixing, sifting, or preparing manures and the different soils for garden and horticultural purposes, and in mixing manures and other fertilizers with earths, and otherwise compounding materials for such purposes.

What I claim as my invention, and desire to secure by Letters Patent, is—

The cylinder D, formed of ribs or staves, armed with teeth in the manner described, and with an open feeding-head, all combined and operated substantially as and for the purposes described.

LEMAN B. PITCHER.

Witnesses:
N. B. SMITH,
C. W. SMITH.